(12) United States Patent
Maas et al.

(10) Patent No.: US 8,074,015 B2
(45) Date of Patent: Dec. 6, 2011

(54) METHOD FOR STORING FILES ON A STORAGE MEDIUM, STORAGE MEDIUM, AND VIDEO RECORDING APPARATUS USING THE METHOD

(75) Inventors: Johann Maas, Langenhagen (DE); Axel Kochale, Springe (DE); Stefan Abeling, Schwarmstedt (DE)

(73) Assignee: Thomson Licensing, Boulogne-Billancourt (FR)

( * ) Notice: Subject to any disclaimer, the term of this patent is extended or adjusted under 35 U.S.C. 154(b) by 540 days.

(21) Appl. No.: 12/231,027

(22) Filed: Aug. 28, 2008

(65) Prior Publication Data
US 2009/0059737 A1 Mar. 5, 2009

(30) Foreign Application Priority Data
Aug. 28, 2007 (EP) ..................................... 07115084

(51) Int. Cl.
*G06F 12/00* (2006.01)
(52) U.S. Cl. ........ 711/112; 711/111; 711/170; 711/171; 711/173; 707/205
(58) Field of Classification Search .................. 711/111, 711/112, 170, 171, 173; 707/205
See application file for complete search history.

(56) References Cited

U.S. PATENT DOCUMENTS

| 5,737,743 | A | 4/1998 | Ooe et al. |
| 7,478,217 | B2 * | 1/2009 | Lin ................................ 711/170 |
| 7,574,580 | B2 * | 8/2009 | Mahashin et al. ............ 711/221 |
| 2002/0059276 | A1 | 5/2002 | Loon et al. |
| 2002/0194209 | A1 | 12/2002 | Bolosky et al. |
| 2005/0031318 | A1 | 2/2005 | Fujita et al. |
| 2006/0008257 | A1 | 1/2006 | Mahashin et al. |
| 2007/0239957 | A1 * | 10/2007 | Lin ................................ 711/170 |
| 2010/0082893 | A1 * | 4/2010 | Ma et al. ....................... 711/103 |

FOREIGN PATENT DOCUMENTS

| AU | 200017852 B2 | 12/1999 |
| JP | 2002/041341 | 2/2002 |
| WO | WO0233586 | 4/2002 |

OTHER PUBLICATIONS

French Search Report dated Feb. 2, 2008.

* cited by examiner

*Primary Examiner* — Jack A Lane
(74) *Attorney, Agent, or Firm* — Robert D. Shedd; Joseph J. Opalach; Jerome G. Schafer

(57) ABSTRACT

In a storage medium, an address space is defined which is divided into a first area and a second area. According to the invention, at least one file is stored on the medium which is split into small data packets and large data packets. All small data packets are stored on said first area, and all large data packets are stored on said second area. A single file allocation table (FAT) is used and is small by having one entry per data packet.

9 Claims, 2 Drawing Sheets

METHOD FOR STORING FILES ON A STORAGE MEDIUM, STORAGE MEDIUM, AND VIDEO RECORDING APPARATUS USING THE METHOD

This application claims the benefit, under 35 U.S.C. §119 of European Patent Application No. 07115084, filed Aug. 28, 2007.

FIELD OF THE INVENTION

The present invention relates to a method for storing files on a storage medium. It also relates to a storage medium. The intended use for the method and the storage medium is in the field of video recording apparatus, in particular of professional hard disc camcorders.

BACKGROUND OF THE INVENTION

When storing files on a storage medium, usually an address space is defined in the storage medium. The files are not always stored as a whole. Rather, they are divided into different packets. Then, it has to be registered where the different portions of the file are stored. To this end, a so-called file allocation table also denoted as FAT is defined. If the address space is defined with respect to units of constant size, the file allocation table usually comprises one entry per such unit. If a packet of the file is stored under an address, there is a respective entry in the file allocation table for that address. In that entry, another address is written. This other address is the address of the location in the address space where the next portion of the file can be found. Therefore, when jumping from one address to the next, the file can be successively retrieved. The file allocation table defines the way the reading head or other transducer accessing the storage medium must go. The smaller the different packets of the file are, the more often the head must jump, causing idle time not usable for data transfer and lowering the average transfer bitrate. Notably, idle times occur upon head jumps both when writing these files and when reading these files. In a video recording apparatus, it is essential that writing as well as reading of files be performed in real time. Every jump the write/read head of the storage medium has to do means a loss in bandwidth. It is therefore desirable that in video recording apparatus the streaming data be stored in large packets. If too small data packets are used, the longer files occupy a multiplicity of small data packets. There is not always a single, contiguous storage place for the whole multiplicity. This means that the data have to be divided and the space will be fragmented.

On the other side, storing data in large packets means a high degree of so-called internal fragmentation, since small files and directories, although physically requiring only a small fraction of a packet, will nevertheless block the entire large packet. Traditional file systems overcome the conflicting requirements of high bandwidth versus low internal fragmentation by using a small packet size but allowing the allocation of so-called extents, that is, a multiplicity of contiguously arranged small data packets. One problem with extents is that frequent allocation and freeing of differently sized data packets, be it single packets or extents, leads to scattered occupancy of available address space. Thus, a situation can occur where the file system doesn't allow further allocation of extents, though there's still enough free space on the partition. This is called external fragmentation. External fragmentation may be overcome by a defragmentation step, which is however time consuming.

In order to meet the requirements that streaming data be stored and read in real-time on one hand, and that the storage medium be not too much internally fragmented on the other hand, WO 02/33586 A2 discloses a single file system featuring a first type of storage unit for storing audio and/or video streams and a second type of storage unit for storing non-stream data, wherein the size of the first storage unit is a predetermined multiple of the size of the second storage unit and second storage units exclusively occur in groups the same size as first storage units. For managing such file system, first to third data structures, first to third indicators, and first to fourth file information structures are used, indicating for the units, among others, whether they are free or not and/or whether they are subdivided or not. This prior art can be seen to have the disadvantage of a high complexity and computing power necessary to implement and execute effective maintenance algorithms for each of the numerous data structures.

A similar scheme has been disclosed in US 2006/0008257 A1. In this system, too, the data type is predetermined. Small files are stored using predetermined units of constant size also named clusters, and video data and large files are stored by using so-called superclusters which are the size of four regular clusters. A first file allocation table is provided for the small files, and a second file allocation table is defined for the large files. The second file allocation table is provided only dynamically upon writing. During interruptions in writing and at the end of the writing, the second file allocation table is converted and transferred to the first file allocation table. The first file allocation table is rather long and difficult to handle. The second file allocation table is more compact than the first allocation table, since there are far fewer superclusters than clusters. However, this advantage is lost at the end of the procedure because the second file allocation table is not maintained.

SUMMARY OF THE INVENTION

It is therefore an object of the present invention to provide a method for storing files on a storage medium which is well-suited for both small and large files without losing too much storage space on the one hand, and wherein the object is on the other hand to be able to make use of a compact file allocation table.

According to the present invention, a method is provided for storing files on a storage medium having an address space organized in units of constant size, which comprises the steps of:
  dividing the address space into a first area for storing small data packets of the length of n of said units of constant size with n=1, 2, 3, . . . and into a second area for storing large data packets of the length of m of said units of constant size with m=2, 3, 4, . . . ; m>n,
  for each file to be stored:
    a) if the length of said file is not greater than the length of a small data packet, storing said file on said first area,
    b) if the length of said file is greater than the length of a small data packet, dividing the file into at least one small data packets and at least one large data packets, and storing the at least one small data packets on said first area and the at least one large data packets on said second area.

Dividing a file into large and small data packets may not always straightforwardly lead to packets of the predetermined size. In order to obtain such data packets, at the end of the file, it may be necessary to add some zero or padding data. In other words, the last one of the data packets of a file may exhibit internal fragmentation by comprising useful data as well as padding. The notion of dividing a file is meant to encompass this.

The method according to the invention is advantageous because it has been recognized that the files to be stored may be either very small or rather large. If n and m are chosen properly, for the small files the small data packet size is sufficient, and in the first area not much storage space is lost. In case the files are large, these files may be nearly entirely stored in the second area without causing too much internal fragmentation. Storing large files in the second area is also very efficient in terms of bandwidth. It is explicitly to be noted that the larger files always comprise a portion which is stored on the first area. This suits the use of a single file allocation table for all files, according to a preferred embodiment of the present application. The file allocation table indicates the addresses of the locations in the first and second area where the data packets are stored. In contrast to standard file allocation tables, there need not be entries for every unit of constant size. Rather, it is sufficient if said file allocation table comprises a first portion having entries for only every n-th unit of constant size in the first area and a second portion having entries for only every m-th unit of constant size in the second area.

This means that if n and m are properly chosen with regard to the types of file which might occur for a particular application, the file allocation table might be very short when compared to file allocation tables in the prior art. A short file allocation table is suitable to be written into the cache such that the system has direct access to the file allocation table without any need to read the file allocation table from the hard disc medium. By this, time is saved.

One preferred embodiment of the present method is that n=1. In this case, the first area is treated as a standard storage area in which the units of constant size defining the address space are used as small data packets. The second area then is for storing large data packets of an integer multiple size of the small data packets.

Depending on the circumstances, it may make sense to define m=16, m=64, m=128, or m=256. More generally, one preferred embodiment is that m>63*n, wherein even m>255*n is preferred.

This splitting of the file into packets for the first area and packets for the second area particularly makes sense if only the beginning of each file is written into a small data packet to be stored in the first area, and the remainder of the file, if any, is written into one or more large data packets to be stored in the second area. If the file comprises streaming data, these are usually preceded by a header that contains file information and other take-related metadata. If the unit of constant size is properly chosen, this enables that the stream itself, i.e. the part after the header, begins with the second packet, which is a large data packet. Moreover, by manipulating the n to m proportion, a suitable size for large data packets can be found, such that the bandwidth requirements will be fulfilled for each data packet in the second area. This also eliminates the need for defragmentation.

The present invention makes sense for any storage medium. However, it is particularly suited if the storage medium is a hard disc array or Redundant Array of Individual Disks also known as RAID, i.e. if it comprises at least one circular rotating disc. Then, the first area may be provided by space on each circular disc which is nearer to the center of the disc than the space on each circular disc providing the second area. For a circular disc rotating at constant angular velocity, the inner radius areas cannot be written to or read from as quickly as the outer areas. Therefore, it makes sense to write the video stream data on the outer portions of the disc.

According to another aspect of the invention, a storage medium in which an address space is defined, wherein said address space is divided into a first area and a second area is characterized in that at least one file is stored in the address space which is split into data packets of two different predetermined sizes, wherein all data packets of small predetermined size are stored on said first area and wherein all data packets of large predetermined size are stored on said second area. Once again it is to be noted that the idea behind such an invention is that files which grow in size beyond one packet of small size are likely to be large and therefore, it is unlikely that only a few bytes are stored in a large data packet occupying several megabytes.

According to a further aspect of the present invention, a video recording apparatus is provided, comprising a storage medium and means for storing video data and/or audio data on the storing medium, wherein the means for storing makes use of the above-mentioned method according to the present invention.

BRIEF DESCRIPTION OF THE DRAWINGS

The following detailed description of a preferred embodiment is made with respect to the drawings, wherein.

DETAILED DESCRIPTION

Figure 1:
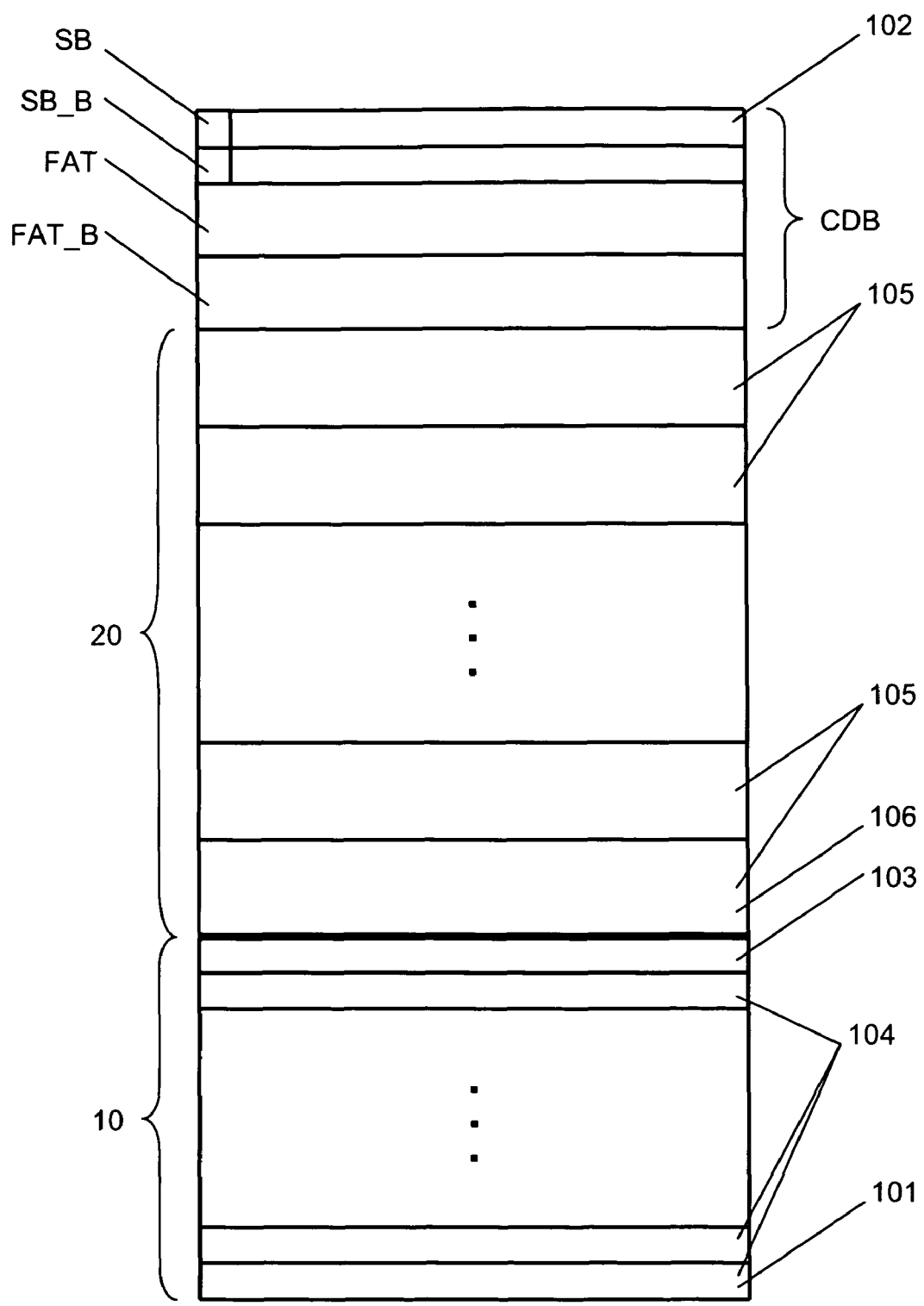
FIG. 1 shows the memory map of all discs in a disc-based storage system according to the present invention and FIG. 2 shows an example of values contained in a file allocation table according to the present invention.

FIG. 1 shows the memory map of all discs in a disc-based storage system according to the present invention. The available physical memory is divided into two different areas, namely a first area 10 and a second area 20. The space in the first area 10 and the second area 20 is given addresses, with a different address or cluster number being provided for each unit of constant size. Such unit, sometimes known as a cluster, may be a single stripe or a multiple of stripes, wherein a stripe is defined as a smallest search unit possible. In a RAID, on each of the discs the smallest search unit is called a block, and a stripe is nothing more than a multiplicity of blocks of all discs which are located or co-sited on the same place of the respective discs.

The first area 10 contains directories and small files, as well as the respective first portions of all large files, be it streaming data or other. All files and file portions in the first area 10 occupy a single unit of constant size, a single cluster 103, 104. The first area 10 is also assumed to contain a root directory cluster 103. In the second area 20, however, large data packets 105 are stored each of which occupies the same multiplicity of units of constant size, i.e. a multiple cluster. The second area 20 is intended for storage of streaming data and large files which require real-time writing and reading. To be more precise, the second area 20 advantageously contains the second and following portions of large files, whereas the first portion thereof is contained in the first area 10, as described above.

At a constant angular velocity and a constant areal data density, an outer disc radius location 102 allows for a quicker reading of data than an inner disc radius location 101 does. Therefore, the first area 10 is advantageously located at the inner disc radius 101, and the second area 20 is located more outside towards the outer disc radius 102. At the outermost disc radius 102, the so-called content description block CDB is located. The content description block CDB comprises a super block SB in the first sector of the first stripe, the file allocation table FAT contained in one or more stripes, as well as a super block backup copy SB_B and a file allocation table backup copy FAT_B.

The super block SB is a read-only structure created at format time and containing file system descriptions, parameter settings and region sizes relating to the entire used address space including the size of the content description block CDB. The super block SB in the file system according to the invention differs from known super blocks in that the borders of the first area 10 and the second area 20 have to be specified therein, for example by defining the first address or first cluster number in the second area 20 and the first address or first cluster number in the first area 10. Moreover, the super block SB comprises the definition of a parameter regarding the size proportion of the large data packets in the second area 20 versus the small data packets in the first area 10. Using the terms defined above: In the super block SB it is defined which multiple of clusters 103, 104 makes up the multiple clusters 105. As mentioned above, the first area 10 comprises the smaller files. These are for example the root directory and other directories and smaller files of any kind. Moreover, when streaming data or large files are to be stored, a first portion thereof, i.e. a first small data packet, is also stored in the first area 10. This first portion is usually nothing else than the header of the streaming data or of large non-streaming files. The remainder of the streaming data or of the large non-streaming files is stored in the second area 20 in large data packets 105 of multiples of the units of constant size.

The file allocation table FAT now enables to efficiently read the files which are divided into data packets 103, 104, 105.

Figure 2:
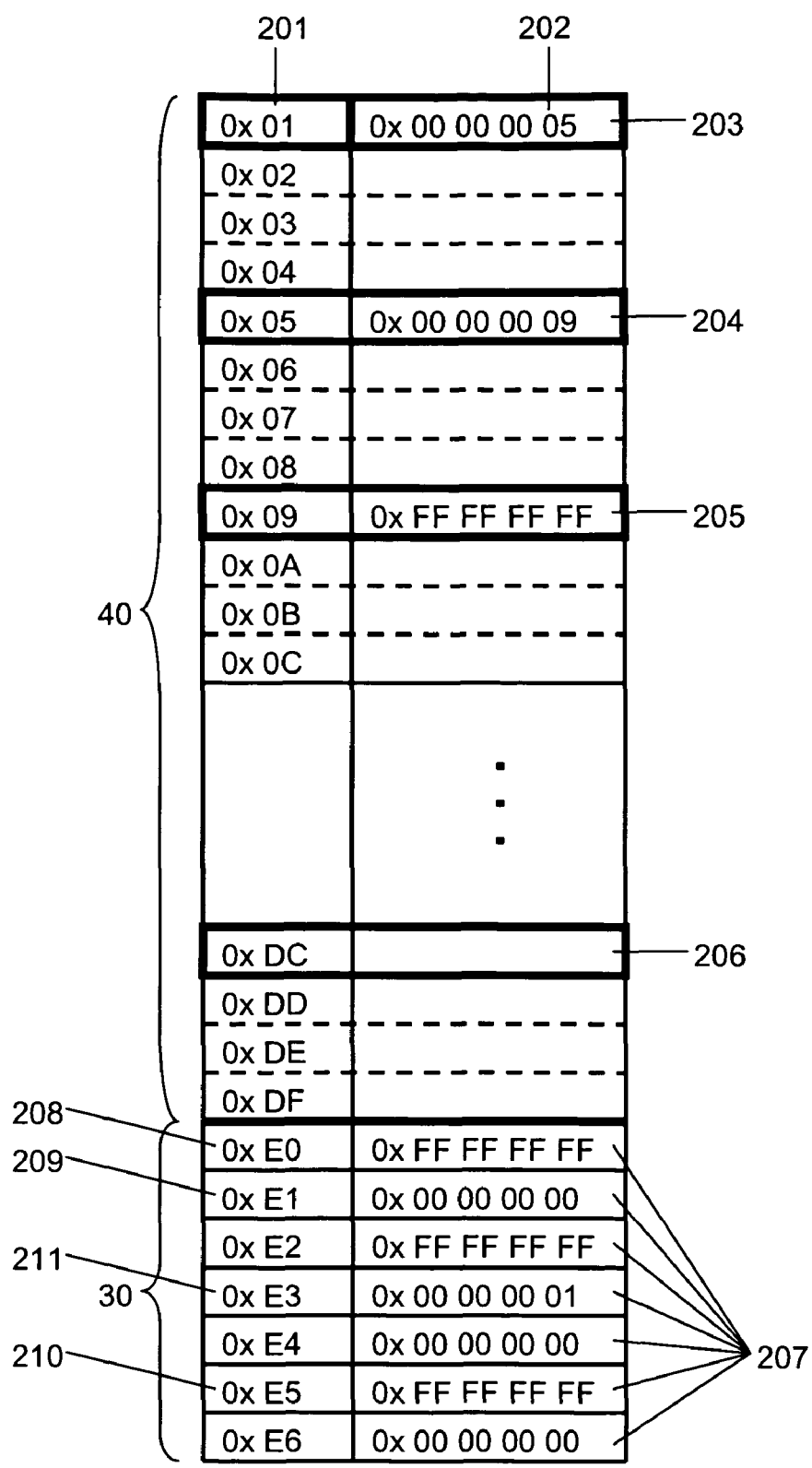

FIG. 2 illustrates an example of values contained in a file allocation table according to the invention.

The file allocation table comprises a first area portion 30 and a second area portion 40. The first area portion 30 of the file allocation table has one entry per unit, i.e. one entry per cluster. The cluster number is provided in the left column 201 of FIG. 2, and the values of the file allocation table entries, denoting, as usual for a FAT, the number of the next cluster, are provided in the right column 202 of FIG. 2. Cluster numbers and values are given in hexadecimal notation, symbolized as usual by the prefix "0x".

In the second area portion 40, only the bold framed fields 203, 204, 205, 206 represent entries in the file allocation table. With other words, whereas in the first area portion 30 the FAT comprises one entry 207 for each of the consecutive clusters of the area, in the second area portion 40 of the FAT the existing table entries 203, 204, 205, 206 relate to clusters that are situated spaced apart on the storage medium, and each of the table entries 203, 204, 205, 206 within the second area portion 40 implicitly relates to an entire group of m clusters. For ease of illustration, in the example shown, m=4 and n=1 is assumed, i.e. the large data packets in the second area 20 are four times as large as the small data packets in the first area 10. In reality, this number or relation might be much higher. Since one large data packet occupies the space corresponding to four clusters, the FAT entries 203, 204, 205, 206 directly relating only to each fourth cluster are sufficient to provide information on the data packet in question. Note that all individual clusters do of course continue to exist, they all are accessible, be it with some address manipulation, by using the given FAT.

The entries of the file allocation table of the example are as follows: Cluster number "0xE0" of the first area portion contains the root directory assumed not to exceed a small data packet size. Correspondingly, the FAT entry for cluster "0xE0" 208 has a value of "0xFFFFFFFF" which is the value predefined to indicate that the root directory ends and has no next cluster.

The FAT entry relating to cluster "0xE1" 209 shows a value of "0x00000000". This is the value predefined to indicate that there is no packet stored in the cluster.

The FAT entry relating to cluster number "0xE5" 210, having a value of "0xFFFFFFFF", indicates the existence of another single file ending in cluster "0xE5" without being continued elsewhere.

The FAT entry relating to cluster number "0xE3" 211 is shown having a value of "0x00000001", indicating that the file contained in cluster "0xE3" is continued in cluster "0x01". With other words, in cluster "0xE3", a portion of a file is stored which is then continued in cluster "0x01". However, since cluster number "0x01" is situated in the second area 20 of the storage space, the FAT entry relates not only directly to cluster "0x01" itself, but also indirectly or implicitly to the 3 subsequent clusters "0x02", "0x03", and "0x04". The portion of the file stored in cluster "0xE3" within the first area 10, assuming that it is the start of the file, will typically comprise the header of a longer file. In the second area portion 40, the FAT entry relating to cluster "0x01" 203 is shown having a value of "0x05". This means that following the large data packet stored in clusters "0x01", "0x02", "0x03", "0x04", a further large data packet of four unit length is stored starting at cluster number "0x05", namely in clusters "0x05", "0x06", "0x07" and "0x08". The FAT entry relating to cluster "0x05" 204, is shown to have a value of "0x00000009", meaning that the file is further continued at clusters "0x09", "0x0A", "0x0B", and "0x0C". The FAT entry related to cluster "0x09" 205, by having a value of "0xFFFFFFFF", indicates that the file ends somewhere within the large data packet starting at cluster "0x09". The FAT itself does not contain information where exactly within that large data packet the file ends. Such information must be retrieved e.g. from an overall file size information from the directory record of the file.

FIG. 2 illustrates that by using only the bold framed fields 203, 204, 205, 206 of the table, the file allocation table needs less entries. In the first area portion 30, each entry corresponds and relates to to one unit of constant size, namely one cluster. In the second area portion 40, each entry corresponds to one large data packet which occupies a sequence of consecutive units of constant size, namely a multiple cluster. The more units of constant size each large data packet in the second area 20 occupies, the less entries are needed for the file allocation table.

Assuming the number of units of constant size per large data packet is 256, assuming further that one unit of constant size is 64 KB, and that the RAID comprises 16 hard discs with a capacity of 100 GB each, and assuming further that the second area occupies 95% of the entire storage area, one can calculate that the file allocation table FAT needs about 330 KB. This is small enough to fit into just one stripe having a size of one block times the number of hard discs, i.e. 64 KB×16=1 MB. Therefore, the file system overhead is kept small and synchronization traffic is kept low. In addition, the file system controllers can load the entire FAT into a random access memory RAM, ensuring that FAT accesses cause very short delays and do not cause input/output traffic at all that could disturb any ongoing streaming mode.

The sustained data rate achievable with the file system according to the invention depends on the sustained performance of a single hard disc at the inner radius boundary 106 of the second area 20 on one hand, and on the frequency of head jumps on a single hard disc on the other hand, the latter in turn depending on the size of the large data packets stored in the second area.

This means that, given a target sustained data rate, the large data packet size necessary to guarantee that rate can exactly be calculated.

The present invention is advantageously performed in all video applications, namely in professional hard disc video recording apparatus like camcorders.

The invention claimed is:

1. A method for storing files on a storage medium having an address space organized in units of constant size, the method comprising the steps of:

dividing the address space into a first area for storing small data packets of a length of n of said units of constant size with n=1, 2, 3, . . . and into a second area for storing large data packets of a length of m of said units of constant size with m=2, 3, 4, . . . ; m>n, for each file to be stored:
a) if the length of the file is not greater than the length of the small data packet, storing the file on the first area,
b) if the length of the file is greater than the length of a small data packet, dividing the file into at least one small data packets and at least one large data packets, and storing the at least one small data packets on the first area and the at least one large data packets on the second area wherein a single file allocation table (FAT) is written for all files, said file allocation table (FAT) indicating the addresses of the locations in the first area and the second area where the data packets are stored, wherein said file allocation table (FAT) comprises a first portion having entries for only every n-th unit of constant size in the first area and a second portion having entries for only every m-th unit of constant size in the second area.

2. A method according to claim 1, wherein n=1.

3. A method according to claim 1, wherein m>63*n and preferably m>255*n.

4. A method according to claim 1, wherein the beginning of each file is written into a small data packet and wherein the remainder of the file, if any, is written in large data packets.

5. A method according to claim 1, wherein the storage medium comprises at least one circular disc, and wherein the first area is provided at or near an inner radius location of the disc and the second area is provided at or near an outer radius location of the disc.

6. A video recording apparatus, comprising a storage medium and means for storing at least one of video and audio data on said storage medium using the method according to claim 1.

7. A storage medium in which an address space is defined, said address space being divided into a first area and a second area, characterized in that at least one file is stored in the address space, said file being split into at least one small data packets and at least one large data packets, wherein the at least one small data packets are stored on said first area and wherein the at least one large data packets are stored on said second area wherein the address space is organized in units of constant size, wherein the small data packets are n of such units long with n=1, 2, 3, . . . and wherein the large data packets are m of said units long, m=2, 3, 4, . . . and m>n, characterized in that a single file allocation table (FAT) is stored on the storage medium, said file allocation table (FAT) indicating the addresses of the locations in the first area and the second area where the data packets are stored, wherein said file allocation table comprises a first portion having entries for only every n-th unit of constant size in the first area and a second portion having entries for only every m-th unit of constant size in the second area.

8. A storage medium according to claim 7, characterized in that, for files that are longer than a small data packet, only the beginning of the file is stored in the first area and the remainder of such file is stored in one or more large data packets on said second area.

9. A storage medium according to claim 7, wherein the storage medium comprises at least one circular disc and wherein the first area is provided by space on each circular disc which is at or near an inner radius location, and the second area is provided by space on each circular disc which is at or near an outer radius location.

* * * * *